(12) United States Patent
Kuperman

(10) Patent No.: US 11,994,209 B2
(45) Date of Patent: May 28, 2024

(54) TRANSMISSION COOLER THERMAL BYPASS DEVICE

(71) Applicant: RevMax Performance, LLC, Charlotte, NC (US)

(72) Inventor: Frank C. Kuperman, Waxhaw, NC (US)

(73) Assignee: REVMAX PERFORMANCE, LLC, Charlotte, NC (US)

(*) Notice: Subject to any disclaimer, the term of this patent is extended or adjusted under 35 U.S.C. 154(b) by 0 days.

(21) Appl. No.: 18/081,196

(22) Filed: Dec. 14, 2022

(65) Prior Publication Data
US 2023/0184331 A1 Jun. 15, 2023

Related U.S. Application Data

(63) Continuation-in-part of application No. 17/405,493, filed on Aug. 18, 2021, now Pat. No. 11,560,945, which is a continuation of application No. 16/688,326, filed on Nov. 19, 2019, now Pat. No. 11,137,070.

(51) Int. Cl.
*F16H 61/40* (2010.01)
*F01P 11/08* (2006.01)
*F16H 57/04* (2010.01)
*F16H 61/4043* (2010.01)

(52) U.S. Cl.
CPC .......... *F16H 61/4043* (2013.01); *F01P 11/08* (2013.01); *F16H 57/0413* (2013.01); *F01P 2060/045* (2013.01)

(58) Field of Classification Search
CPC .................. F16H 57/043; F01P 2060/045
See application file for complete search history.

(56) References Cited

U.S. PATENT DOCUMENTS

| | | | |
|---|---|---|---|
| 5,165,468 A | 11/1992 | Tajima et al. | |
| 9,133,952 B2 | 9/2015 | Lamb et al. | |
| 9,835,060 B2 | 12/2017 | Gooden | |
| 10,132,401 B2 | 11/2018 | Gooden | |
| 2004/0173341 A1 | 9/2004 | Moser et al. | |
| 2005/0006078 A1 | 1/2005 | Jeong | |
| 2007/0164123 A1* | 7/2007 | Willers | G05D 23/1333 236/93 R |
| 2009/0025922 A1* | 1/2009 | Strzelczyk | G05D 23/022 165/297 |

(Continued)

FOREIGN PATENT DOCUMENTS

KR 10-2009-0112867 10/2009

OTHER PUBLICATIONS

Prior Art Figures 1-3.

*Primary Examiner* — Long T Tran
(74) *Attorney, Agent, or Firm* — Seth L. Hudson; Maynard Nexsen PC

(57) ABSTRACT

A transmission cooler thermal bypass device that includes a body having a front side, a back side, a top side, and a bottom side. A first opening, a second opening, a third opening, and a fourth opening, whereby a first passageway connects the first opening and the second opening, and a second passageway connects the third opening and the fourth opening. At least one fin extends from an outer surface of the top side of the body. The first passageway and the second passageway do not include a flow control valve.

6 Claims, 8 Drawing Sheets

(56) References Cited

U.S. PATENT DOCUMENTS

| | | | |
|---|---|---|---|
| 2009/0229812 A1* | 9/2009 | Pineo | F28F 27/02 137/468 |
| 2010/0224258 A1* | 9/2010 | Steveley | F16K 15/044 137/12 |
| 2011/0061744 A1* | 3/2011 | Zillig | F16K 11/22 137/15.01 |
| 2011/0296824 A1 | 12/2011 | Jackson et al. | |
| 2014/0027099 A1 | 1/2014 | Sispera et al. | |
| 2014/0251579 A1 | 9/2014 | Sloss | |
| 2014/0262200 A1* | 9/2014 | Sheppard | F28D 1/0333 137/637.1 |
| 2015/0096729 A1 | 4/2015 | Dziubinschi et al. | |
| 2015/0168274 A1 | 6/2015 | Sheffield | |
| 2015/0211395 A1* | 7/2015 | Gooden | F01M 5/007 236/34.5 |
| 2016/0215664 A1 | 7/2016 | Boyer et al. | |
| 2016/0258342 A1* | 9/2016 | Zahdeh | F01P 7/165 |
| 2018/0031111 A1* | 2/2018 | Mehravaran | F28F 27/02 |
| 2018/0274406 A1 | 9/2018 | Dries et al. | |
| 2019/0284973 A1 | 9/2019 | Kim et al. | |

\* cited by examiner

TRANSMISSION COOLER THERMAL BYPASS DEVICE

CROSS REFERENCE TO RELATED PATENT APPLICATION

The present patent application is a continuation-in-part of U.S. patent application Ser. No. 17/405,493 filed on Aug. 18, 2021 titled "TRANSMISSION COOLER THERMAL BYPASS DEVICE," which is a continuation of U.S. Pat. No. 11,137,070 filed on Nov. 19, 2019 titled "TRANSMISSION COOLER THERMAL BYPASS DEVICE", the contents of which are incorporated in full by reference herein.

FIELD OF THE INVENTION

The present invention relates generally to transmission cooler thermal bypass device and more generally relates to a transmission cooler thermal bypass device that does not incorporate an actuator, spring valve, or flow control valve and contains fins for thermal cooling.

BACKGROUND OF THE INVENTION

Transmission cooler thermal bypass devices are used with a transmission to create a flow path for receiving and transporting fluid from a heat source to a cooler. Once the fluid is cooled, the transmission cooler thermal bypass creates a path for receiving and transporting the fluid from the cooler to the heat source and/or gear box.

A prior art transmission cooler thermal bypass device is illustrated in FIGS. 1-3. The prior art transmission cooler thermal bypass device contains a flow control valve and does not contain fins. The flow control valve is a necessity for the prior art transmission cooler thermal bypass devices. It is an object of the present invention to provide a transmission cooler thermal bypass device that does not use a flow control valve, or any other actuator or spring valve. It is a further object of the present invention to provide a transmission cooler thermal bypass device that includes fins.

BRIEF SUMMARY OF THE INVENTION

According to an embodiment of the present invention, a transmission cooler thermal bypass device includes a body having a front side, a back side, a top side, a bottom side, a first opening, a second opening, a third opening, and a fourth opening. The first passageway connects the first opening and the second opening, and a second passageway connects the third opening and the fourth opening. The first passageway and the second passageway does not include a flow control valve.

According to another embodiment of the present invention, a transmission cooler thermal bypass device includes at least one fin.

According to yet another embodiment of the present invention, a transmission cooler thermal bypass device includes an internally threaded first opening, second opening, third opening, and fourth opening.

According to yet another embodiment of the present invention, a transmission cooler thermal bypass device includes a second passageway that is angled upwards from the third opening to the fourth opening.

According to yet another embodiment of the present invention, a transmission cooler thermal bypass device includes a plurality of fins.

According to yet another embodiment of the present invention, a transmission cooler thermal bypass device includes at least one fin extending from an outer surface of the first side of the body.

According to yet another embodiment of the present invention, a transmission cooler thermal bypass device includes a plurality of fins extending from an outer surface of the first side of the body.

According to yet another embodiment of the present invention, a transmission cooler thermal bypass device includes According to yet another embodiment of the present invention, a transmission cooler thermal bypass device includes According to yet another embodiment of the present invention, a transmission cooler thermal bypass device includes a body having a front side, a back side, a top side, a bottom side, a first opening, a second opening, a third opening, and a fourth opening. A first passageway connects the first opening and the second opening, and a second passageway connection the third opening and the fourth opening. The device includes at least one fin.

According to yet another embodiment of the present invention, a transmission cooler thermal bypass device includes a body having a front side, a back side, a top side, a bottom side, a first opening, a second opening, a third opening, and a fourth opening. A first passageway connects the first opening and the second opening, and a second passageway connects the third opening and the fourth opening. The device includes at least one fin and the first passageway and the second passageway do not include a flow control valve.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
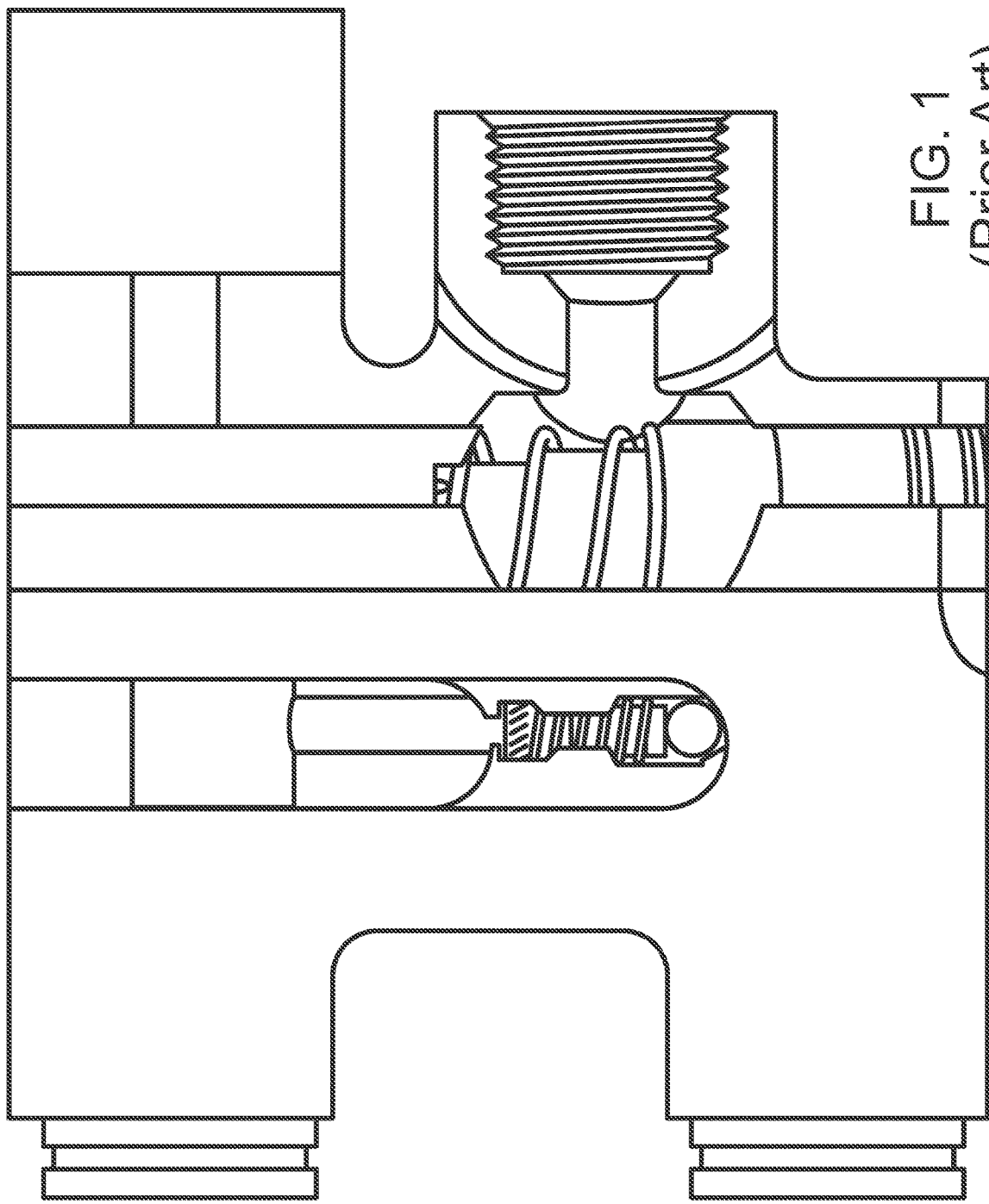
FIG. 1 is a cut-away view of a prior art transmission cooler thermal bypass device.
Figure 2:
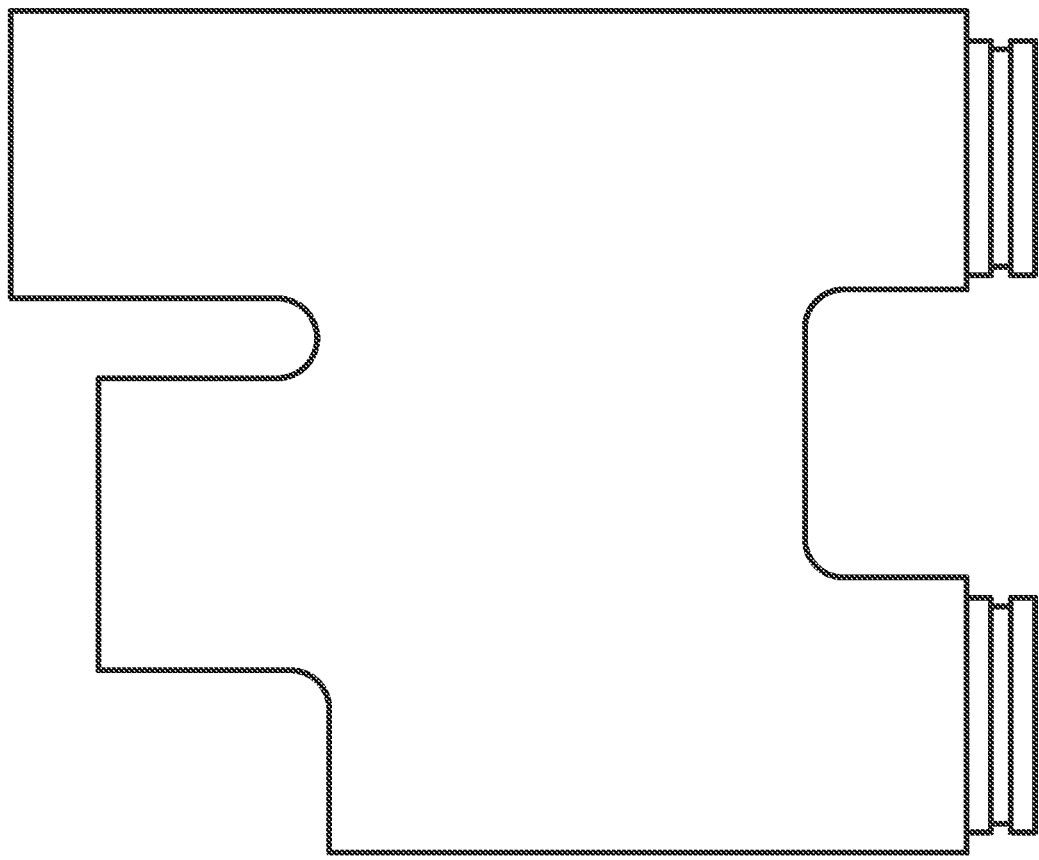
FIG. 2 is a front view of a prior art transmission cooler thermal bypass device.
Figure 3:
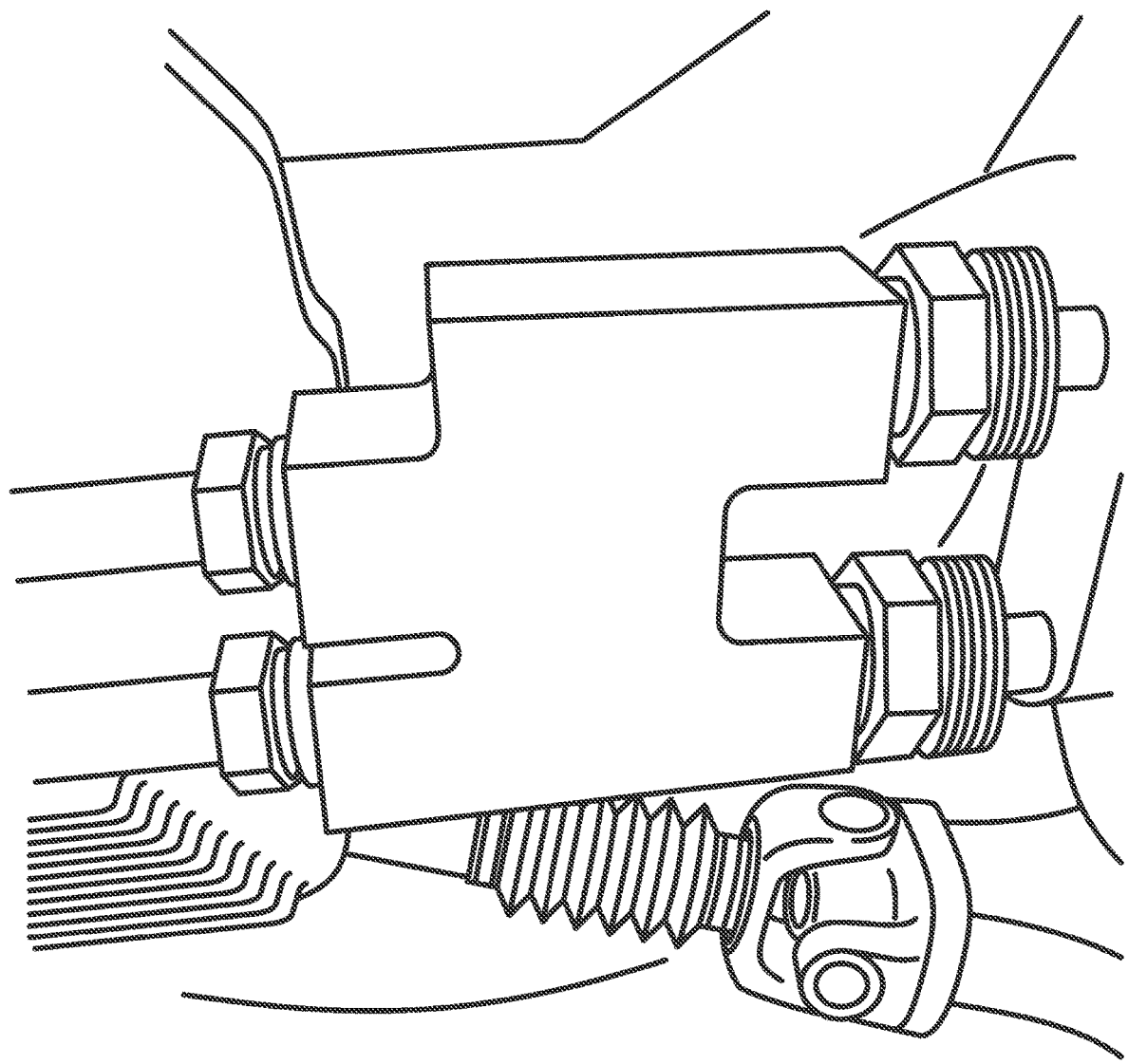
FIG. 3 is a front perspective view of a prior art transmission cooler thermal bypass device.

FIGS. 1-3 show a prior art transmission cooler thermal bypass device. The prior art device, as shown in FIG. 1, contains an actuator, spring valve, or flow control valves. As shown in FIGS. 2 and 3, the prior art devices do not contain fins on the outer surface of the body.

Figure 4:
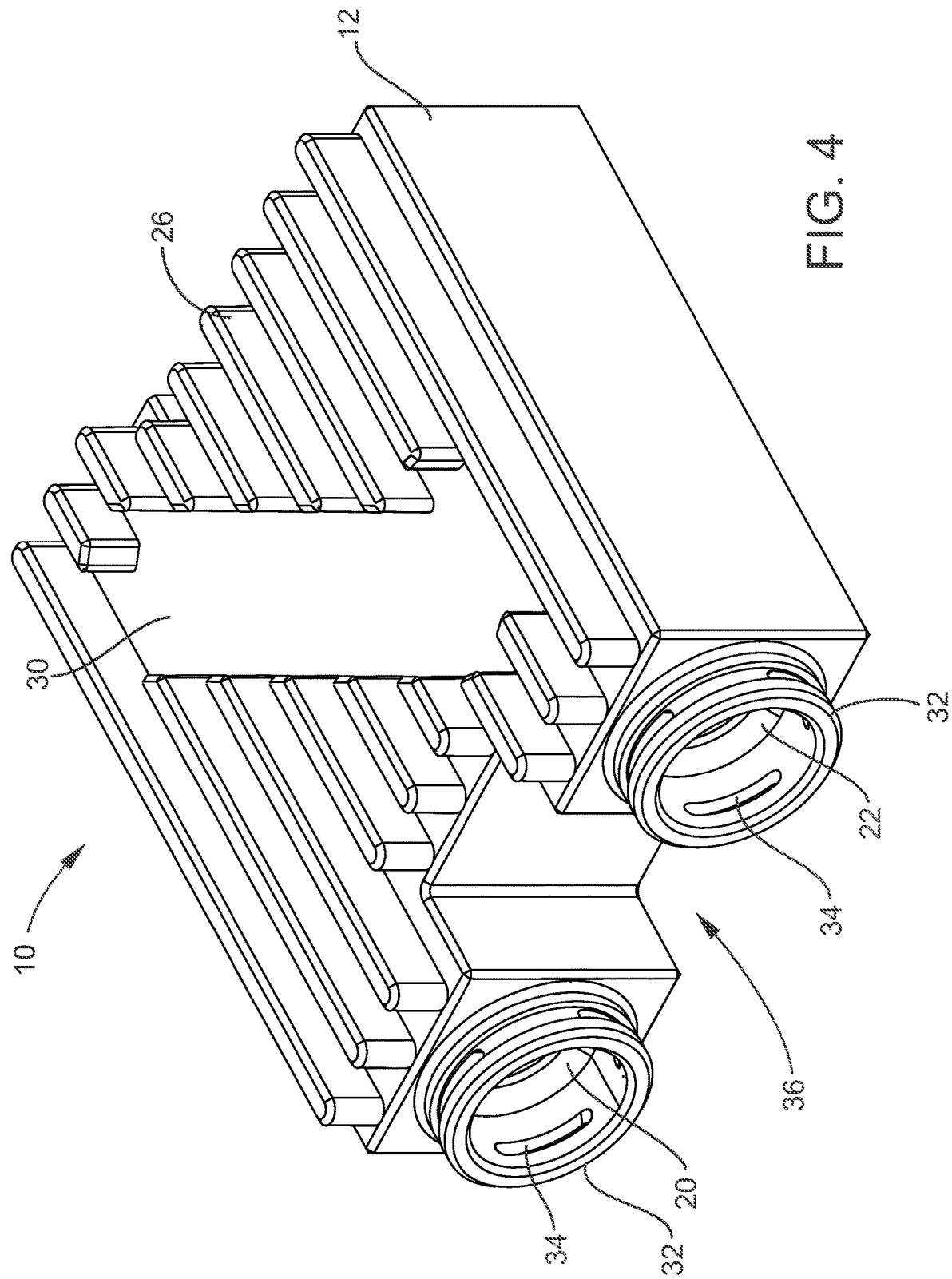
FIG. 4 is a perspective view of the transmission cooler thermal bypass device of the present invention.
Figure 5:
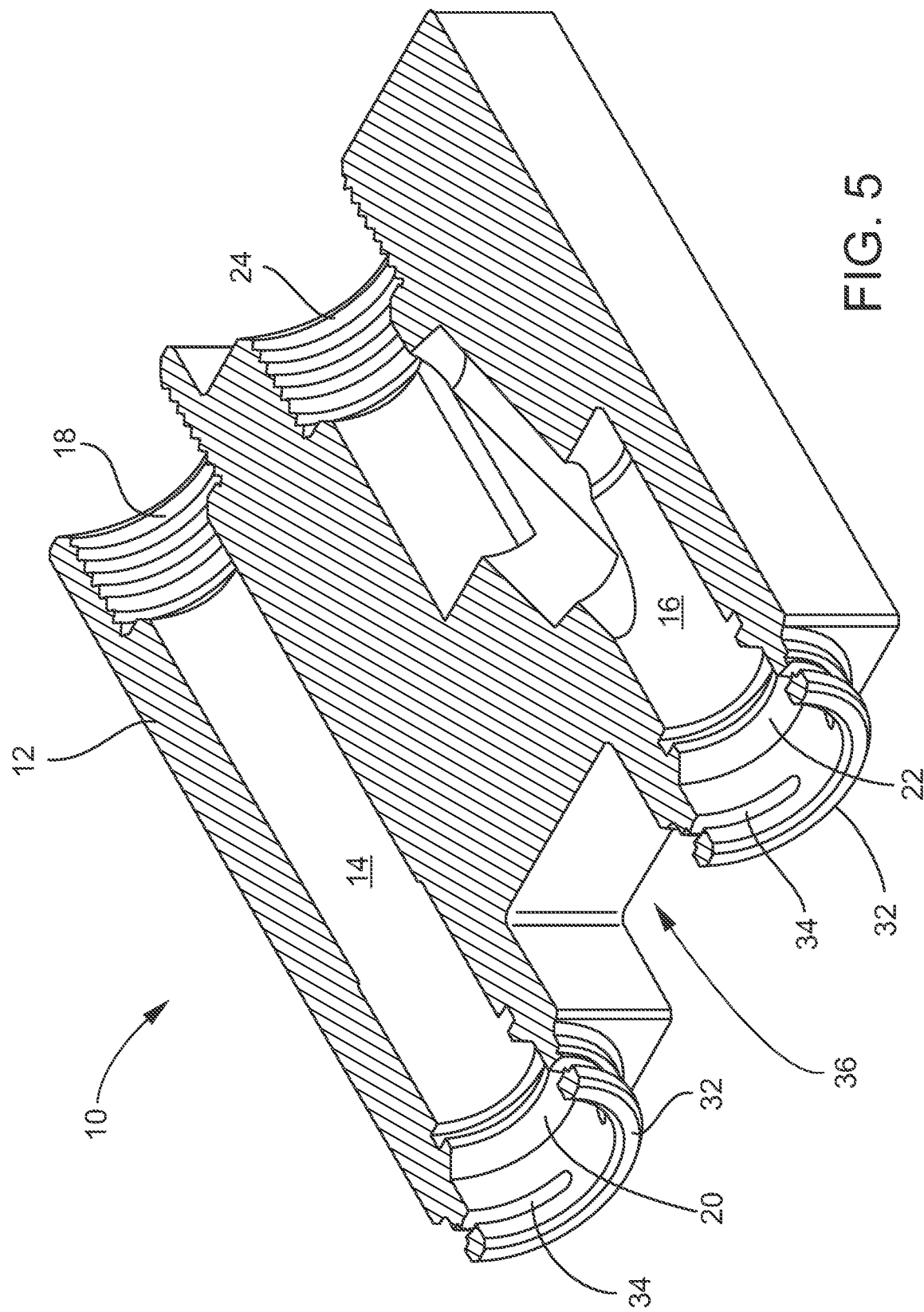
FIG. 5 is a cut-away view of the transmission cooler thermal bypass device showing the openings and passageways within the body.

Referring now specifically to the drawings, a transmission cooler thermal bypass device is illustrated in FIG. 4 and is shown generally at reference numeral 10. The transmission cooler thermal bypass device 10 has a body 12 that contains a front side, back side, top side, bottom side, a first end and a second end. and contains a first passageway 14 and a second passageway 16, as shown in FIG. 5. The transmission cooler thermal bypass device 10 also contains four openings (18, 20, 22, 24), wherein the first opening 18 and the second openings 20 are associated with the first passageway 14, and the third openings 22 and the fourth opening 24 are associated with the second passageway 16.

Each opening (18, 20, 22, 24) is disposed on the first end or the second end of the body 12 of the transmission cooler thermal bypass device 10. The first passageway 14 and the second passageway 16 extend through the body 12 from the first end to the second end of the body 12. The first passageway 14 extends from the first opening 18 to the second opening 20. The second passageway 16 extends from the third opening 22 to the fourth opening 24. The openings (18, 20, 22, or 24) are concentric or have a circular cross-section.

The first opening 18 fluidly communicates with a heat source, such as a valve body and receives fluid from the heat source. The second opening 20 fluidly communicates with the fluid cooler input for depositing fluid to the cooler. The third opening 22 fluidly communicates with the fluid cooler and receives cooled fluid from the fluid cooler. The fourth opening 24 fluidly communicates with the heat source, such as a gear box, and returns fluid cooled to the heat source. Each opening may be internally threaded for receiving a correspondingly threaded hose or engagement device.

Figure 6:
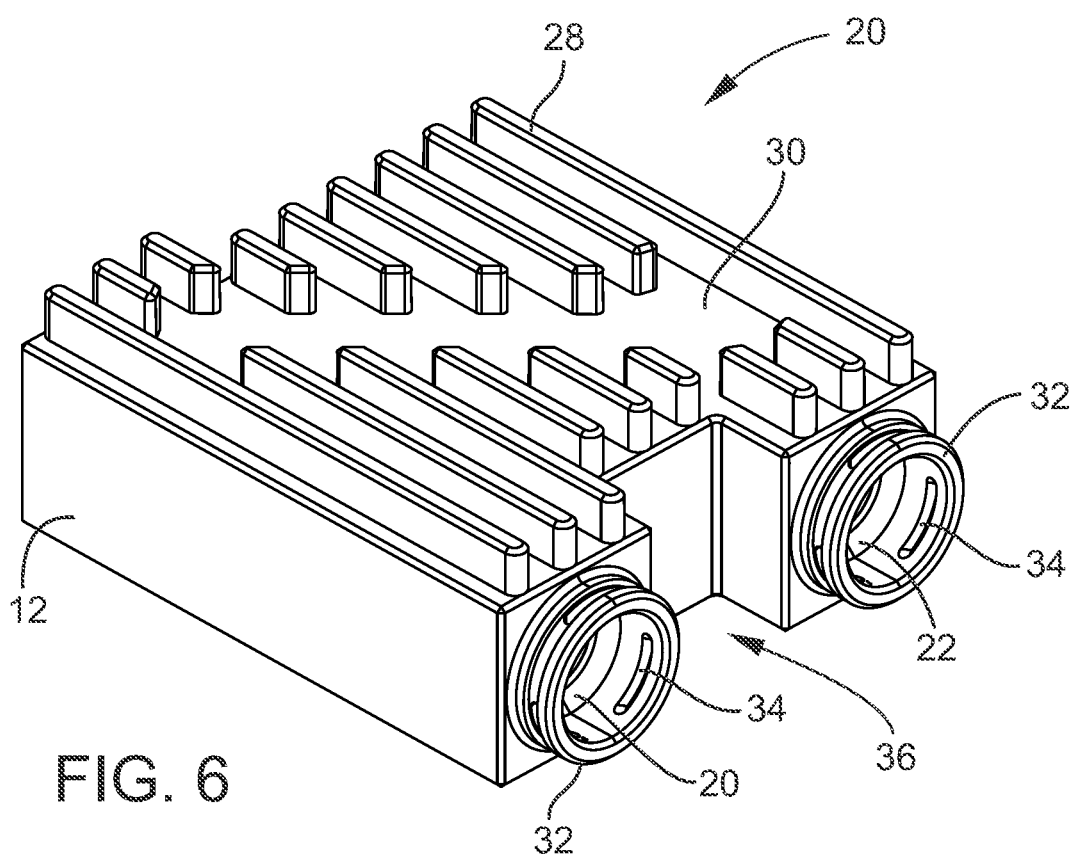
FIG. 6 is a top perspective view of the transmission cooler thermal bypass device of the present invention.
Figure 7:
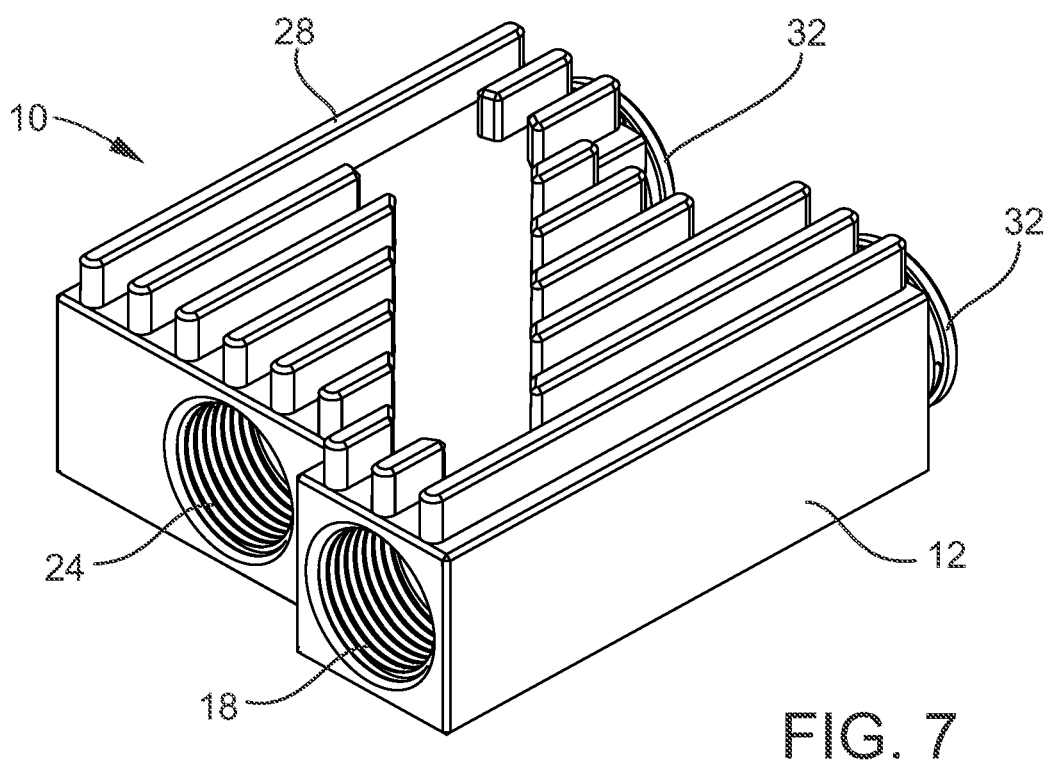
FIG. 7 is another top perspective view of the transmission cooler thermal bypass device of the present invention.

As shown in FIGS. 4, 6, 7, 8, 10, 12, and 15, the top side of the body 12 contains a plurality of fins 26. The fins 26 extend from the outer surface of the top side of the body 12 and upwardly from the outer surface of the top side. As illustrated in FIGS. 4, 6, and 7, a void 30 is disposed within the plurality of fins 26, where no fins 26 extend from the outer surface of the top side of the body 12. Within the void 30, the outer surface of the top side of the body 12 is exposed for allowing indicia to be placed thereon. The indicia may be a word(s), logo, marking, or the like for identifying the manufacturer of the device, the trade name of the device, or any other type of indicia or marking desired by the manufacturer, seller, or user. Alternatively, a void 30 may not be disposed on the top side of the body 12, and in this arrangement, a plurality of fins 26 are spaced-apart on the entire top side of the body 12.

Adjacent the first end of the body 12, one fin 26 extends along the top side of the body 12 from an outer edge of the top side adjacent the front side to an outer edge of the top side adjacent the back side of the body 12. Adjacent the second end of the body 12, one fin 26 extends along the top side of the body 12 from an outer edge of the top side adjacent the front side to an outer edge of the top side adjacent the back side. Between the fin 26 adjacent the first end of the body 12 and the fin 26 adjacent the second end of the body 12 mentioned above, a plurality of fins 26 are disposed along the top side of the body 12. A plurality of fins 26 may extend along the top side of the body 12 from the front side towards the back side and terminate at the void 30. Similarly, a plurality of fins 26 may extend along the top side of the body 12 from the back side to the front side and terminate at the void 30, as illustrated in the FIGS. 4 and 12. The void 30 is optional and the transmission cooler thermal bypass device 10 of the present invention may not contain a void 30 or may contain a void 30 of a different shape than illustrated. When the transmission cooler thermal bypass device 10 does not contain a void 30, a single fin 26, two or more fins 26, or a plurality of fins 26 may extend along a portion of the outer surface of the top side of the body 12, or may extend along substantially the entire length of the outer surface of the top side of the body 12, or may extend along the entire length of the outer surface of the top side of the body 12.

The body 12 and fins 26 are preferably composed of steel. As shown in FIGS. 4, 6, and 7, the fins 26 are preferably spaced apart from each other, and most preferably spaced an equal distance apart from each other. Each fin 26 has a two opposed sides, two opposed ends, and a top portion. The two opposed sides and two opposed ends extend upwardly from the outer surface of the top side of the body 12 to an upper end. The top portion is engaged to the upper end of the two opposed sides and two opposed ends. The transition between upper end to the top portion, which extends along the entire outer periphery of the fin 26, is preferably chamfered, beveled, or a combination of the two. For instance, the transition from an end of a fin 26 adjacent the void 30, may be beveled as illustrated in FIGS. 4, 6, and 7, while the remaining portion of the transition is chamfered. One or more of the ends of the fin 26 may be rounded or curved. One or more of the ends of the fin 26 may be angled, meaning one edge of the end extends further than the other edge of the end, resulting in an angled face portion of the end, extending from one edge to the other edge. As shown in FIGS. 4, 6, and 7, both ends of at least one fin 26 may be rounded or curved, while at least one fin 26 may have one end rounded or curved and the opposed end angled.

As the fluid flows through the first passageway 14 and second passageway 16, the fluid, especially the fluid flowing into the first opening 18 and into the first passageway 14 will be at a high temperature. The heat of the fluid is conducted through the body 12 and through the fins 26. The heat is then transferred to the air flowing between the fins 26. The transmission cooler thermal bypass 10 assists with the heat transfer of the fluid flowing through the passageways (14, 16).

As shown in FIG. 5, the first passageway 14 extends from the front side to the back side of the body 12 and is a straight passageway, meaning the first passageway 14 is not angled as it progresses from the front side to the back side of the body 12 or not angled as the first passageway extends between the first opening 18 and the second opening 20. The first passageway 14 is concentric or has a circular cross section along the length of the first passageway 14 or substantially along the length of the first passageway 14. The diameter of the first passageway 14 is generally constant as it extends between the first opening 18 and the second opening 20. The first opening 18 and the second opening 20 are positioned opposite one another, wherein the first opening 18 is disposed within the front side, and the second opening 20 is disposed within the back side and directly across from each other of the body 12.

The second passageway 16 extends from the front side to the back side of the body 12 and is angled downwards from the third opening 22 to the fourth opening 24. The fourth opening 24 is internally threaded and an elongate second passageway 16 is formed within the body 12, extending from the front side to the back side of the body 12. The third opening 22 is disposed on the front side and the fourth opening 24 is disposed on the back side of the body 12, wherein the second passageway 16 extends between the third opening 22 to the fourth opening 24. The third opening 22 and the fourth opening 24 are not positioned directly across from each other on the opposite side of the body 12, similar to the first opening 18 and the second opening 20. Instead, the fourth opening 24 is positioned below or offset on the back side of the body 12 with respect to the location of the third opening 22 on the front side, as shown in FIG. 5. Alternatively, the fourth opening 24 may be positioned on the back side at a position that is above the position of the third opening 22 on the front side of the body 12, resulting in the second passageway 16 being angled upwards from the third opening 22 to the fourth opening 24.

The second passageway 16 extends from the third opening 22 to the fourth opening 24, allowing fluid to flow through the body 12. The transmission cooler thermal bypass device 10 has a longitudinal axis extending from the front side to the back side of the body 12. As illustrated in FIG. 5, the second passageway 16 includes a first portion that extends longitudinally in the direction of the longitudinal axis for a predetermined distance "L" from the third opening 22. Likewise, the second passageway 16 includes a second portion that extends longitudinally in the direction of the longitudinal axis for a predetermined distance "L'" from the fourth opening 24. A central passageway portion connects the first portion and the second portion, collectively forming the second passageway 16. The central passageway portion may contain various shapes, contours, dimensions, and surfaces depending upon how the second passageway 16 is milled into the body 12 of the transmission cooler thermal bypass device 10. The central passageway portion contains an inlet and an outlet, wherein the inlet and outlet are disposed within the first portion and the second portion, allowing fluid to flow through the first portion, into the central passageway portion, and then into the second portion. The first portion and the second portion are concentric or have a circular cross-section, wherein the diameter of the first portion is identical or substantially identical to the diameter of the third opening 22 and the diameter of the second portion is identical or substantially identical to the diameter of the fourth opening 24.

Figure 8:
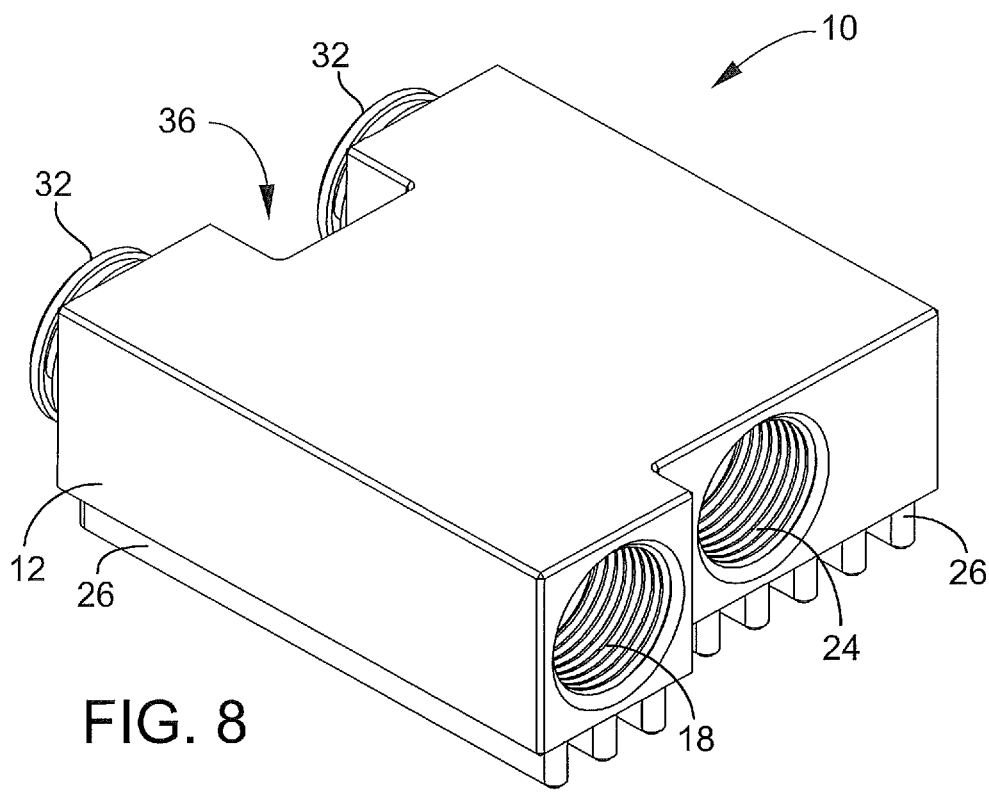
FIG. 8 is a bottom perspective view of the transmission cooler thermal bypass device of the present invention.
Figure 9:
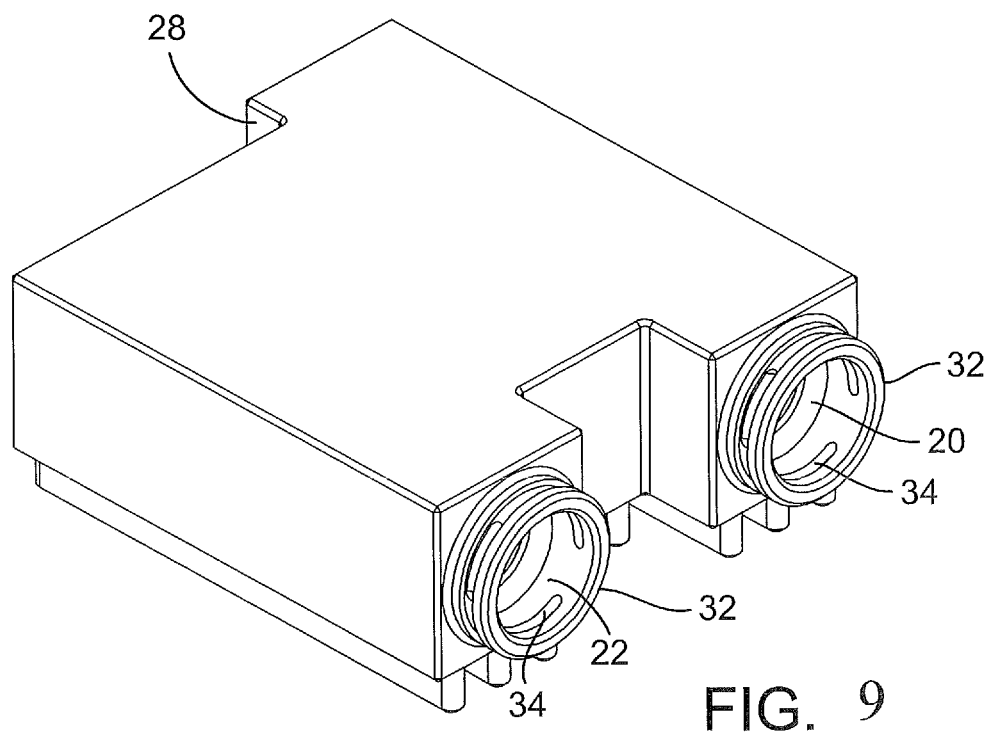
FIG. 9 is another bottom perspective view of a transmission cooler thermal bypass device of the present invention.
Figure 10:
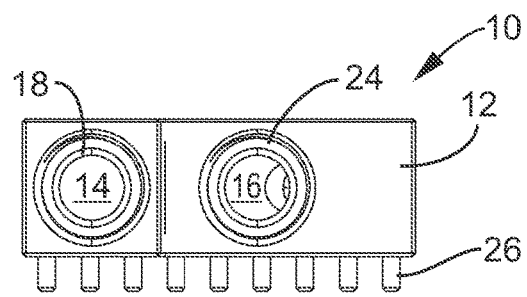
FIG. 10 is a back view of a transmission cooler thermal bypass device of the present invention.
Figure 11:
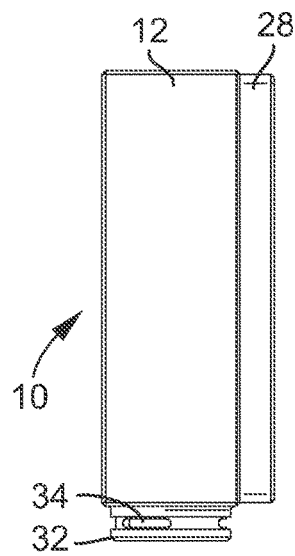
FIG. 11 is a side view of a transmission cooler thermal bypass device of the present invention.
Figure 12:
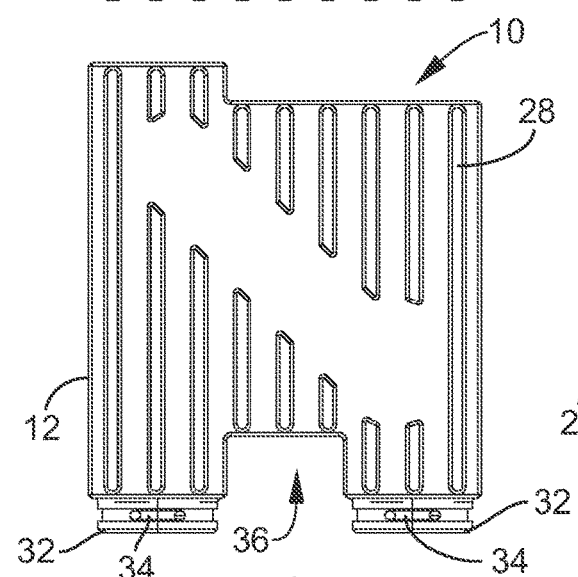
FIG. 12 is a top view of a transmission cooler thermal bypass device of the present invention.
Figure 13:
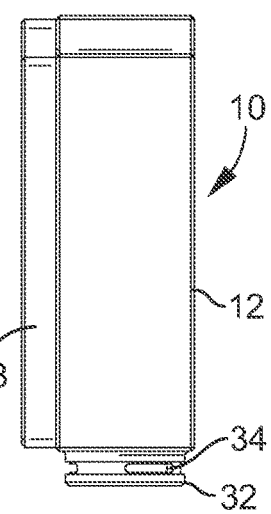
FIG. 13 is a side view of a transmission cooler thermal bypass device of the present invention.

The first opening 18 and the fourth opening 24, as shown in FIGS. 5, 7, and 8, are internally threaded for receiving a correspondingly threaded hose, pipe, or the like for securing an end of the hose, pipe, or like apparatus for transporting fluid to the first opening 18 and the fourth opening 24 and introducing the fluid into the first passageway 14 and the second passageway 16. A fitting 32 is disposed at the second opening 20 and the third opening 22, as shown in FIGS. 4, 5, 6, and 9. The fitting 32 is concentric to match the concentric configuration of the second opening 20 and third opening 22 having an internal surface and external surface. The external surface of the fitting 32 contains a first concentric ring and a second concentric ring, wherein the first concentric ring extends from the external surface of the fitting 32 and disposed adjacent the body 12. The second concentric ring extends from the external surface of the fitting 32 and disposed adjacent the outer edge of the fitting 32 and spaced-apart from the first concentric ring and the second concentric ring. At least one slot 34 is disposed between the first concentric ring and the second concentric ring extending from the exterior surface to the internal surface. The at last one slot 34 is preferably oval shaped. As illustrated in FIGS. 4, 6, and 9, each fitting 32 contains three slots 34 circumferentially disposed around the fitting and spaced an equal distance apart from each other. Each slot 34 has an identical oval shape. While three slots 34 are shown in the figures, the fitting may have any number of slots 34 necessary to engage a corresponding fitting on a hose, pipe, or like apparatus for transporting fluid. For example, the fitting 32 may have one slot 34, two or more slots 34, or a plurality of slots 34, such as three. The slots 34 are designed to receive a corresponding rib structure on a corresponding fitting (not shown) for selectively securing the corresponding fitting to the fitting 32 of the transmission cooler thermal bypass device 10.

Figure 14:
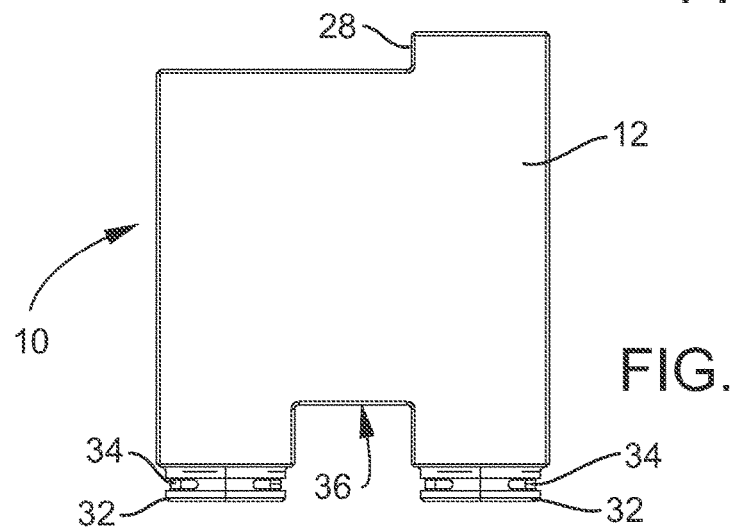
FIG. 14 is a bottom view of a transmission cooler thermal bypass device of the present invention.
Figure 15:
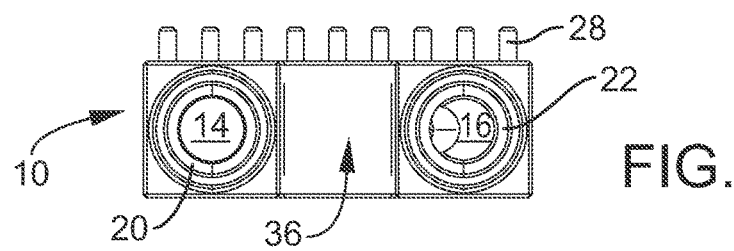
FIG. 15 is a front view of a transmission cooler thermal bypass device of the present invention.

The length of the second end of the body 12 may be greater than the length of the first end of the body 12, as illustrated in FIG. 14. Specifically, the portion of the top side and bottom side of the body 12 adjacent the second end of the body 12 has a length greater than the length of the top side and bottom side of the body 12 adjacent the first end of the body 12, including the second end of the body 12 greater in length than the first end of the body 12. The first passageway 14 is disposed in close proximity to the second end of the body 12, resulting in the length of the first passageway 14 being greater than the length of the second passageway 16. As a result in the differing lengths of the body 12, a shelf 28 is formed on the back side of the body 12 at the transition point between the two separate lengths of the body 12 and between the first opening 18 and the fourth opening 24 on the back side of the body 12. The shelf 28 is formed on the portion of the body 12 where the length of the top side and bottom side of the body 12 extends outward, creating a portion of the body 12 with a greater length than the rest of the body 12, as shown in FIGS. 9 and 14.

The front side of the body 12 contains a cavity 36 within the body 12 and disposed between the second opening 20 and the third opening 22. The cavity 36 contains a base portion and two sidewalls extending outwardly from the base portion. The cavity 36 is generally u-shaped. The transmission cooler thermal bypass device 10 does not incorporate an actuator, spring valve, or flow control valve within the body 12 or the first passageway 14 or the second passageway 16.

The transmission cooler thermal bypass device 10 may have a body 12 that is not a solid piece, but is split into two sections. In other words, the body 12 of the transmission cooler thermal bypass device 10 may be a solid, integral piece, or may be split into two or more portions, such as a first portion and a second portion. When the transmission cooler thermal bypass device 10 is composed of two or more portions, each portion contains at least one bore for receiving an engagement mechanism for engaging the portions together. For example, a first portion may contain at least one bore, and preferably two or more bores, while the second portion may also contain at least one bore, and preferably two or more bores. An engagement mechanism, such as a bolt screw or the like, is inserted into the bores for securing the first portion to the second portion. In this arrangement, the openings (18, 20, 22, 24) and the first passageway 14 and the second passageway 16 may be located within either the first portion or the second portion, or alternatively a portion of the openings (18, 20, 22, 24) and the first passageway 14 and the second passageway 16 are partially disposed within the first portion and the second portion and mating the first portion to the second portion forms the entire openings (18, 20, 22, 24) and the first passageway 14 and the second passageway 16. While FIG. 5 is intending to show an internal cut-away view of the body 12 of the transmission cooler thermal bypass device 10, the figure could also illustrate a first portion when the transmission cooler thermal bypass device 10 is split into two sections. The second portion would have an identical or substantially identical arrangement or structure, allowing the first portion and the second portion to be engaged to each other, collectively forming the openings (18, 20, 22, 24) and passageways (14, 16). A portion of each opening (18, 20, 22, 24) and passageway (14, 16) is milled into the first portion and second portion. Alternatively, half of each opening (18, 20, 22, 24) and/or half of each passageway (14, 16) can be milled or disposed within the first portion and half of each opening (18, 20, 22, 24) and/or half of each passageway (14, 16) can be milled or disposed within the second portion.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

The invention claimed is:

1. A transmission cooler thermal bypass device, comprising:
   a body having a front side, a back side, a top side, a bottom side, a first end, a second end, a first opening, a second opening, a third opening, and a fourth opening;
   a first passageway connecting the first opening and the second opening, the first passageway extending through the body from the front side to the back side;
   a second passageway connecting the third opening and the fourth opening, the second passageway extending through the body from the front side to the back side and angled between the third opening to the fourth opening;
   at least one fitting positioned within the first opening, the second opening, the third opening, or the fourth opening;
   whereby the first passageway and the second passageway do not include a flow control valve.

2. The transmission cooler thermal bypass device according to claim 1, further comprising at least one fin extending from an outer surface of the top side of the body.

3. The transmission cooler thermal bypass device according to claim 1, further comprising a plurality of fins extending from an outer surface of the top side of the body.

4. A transmission cooler thermal bypass device, comprising:
   a body having a front side, a back side, a top side, a bottom side, a first end, a second end, a first opening disposed on the back side, a second opening disposed on the front side, a third opening disposed on the front side, and a fourth opening disposed on the back side;
   a first passageway connecting the first opening and the second opening, the first passageway extending through the body from the front side to the back side;
   a second passageway connecting the third opening and the fourth opening, the second passageway extending through the body from the front side to the back side and containing a first portion extending a predetermined distance from the third opening and a second portion extending a predetermined distance from the fourth opening, the first portion and the second portion are connected by a central passageway portion; and
   at least one fin extending from an outer surface of the top side of the body.

5. The transmission cooler thermal bypass device according to claim 4, further comprising a plurality of fins extending from an outer surface of the top side of the body.

6. A transmission cooler thermal bypass device, comprising:
   a body having a front side, a back side, a top side, a bottom side a first opening, a second opening, a third opening, and a fourth opening;
   a first passageway connecting the first opening and the second opening, the first passageway extending through the body from the front side to the back side;
   a second passageway connecting the third opening and the fourth opening, the second passageway extending through the body from the front side to the back side and angled from the third opening to the fourth opening;
   at least one fitting positioned within the first opening, the second opening, the third opening, or the fourth opening; and
   a plurality of fins extending from an outer surface of the top side of the body;
   whereby the first passageway and the second passageway do not include a flow control valve.

\* \* \* \* \*